United States Patent
Diehl et al.

[11] Patent Number: 5,659,653
[45] Date of Patent: Aug. 19, 1997

[54] METHOD FOR PROGRAMMING A RECORDING DEVICE AND PROGRAMMING DEVICE

[75] Inventors: Eric Diehl, Strasbourg; Nour-Eddine Tazine, Plobsheim, both of France

[73] Assignee: Thomson Consumer Electronics, S.A., France

[21] Appl. No.: 253,934

[22] Filed: Jun. 3, 1994

[51] Int. Cl.$^6$ .................................................. H04N 5/76
[52] U.S. Cl. ............................ 386/46; 358/908; 348/734; 348/460; 348/906
[58] Field of Search ...................... 358/335, 310, 358/908; 348/6, 7, 12, 13, 731, 732, 734, 460, 906, 907; 360/33.1; 386/46; H04N 5/76, 5/775, 5/78

[56] References Cited

U.S. PATENT DOCUMENTS

| | | | |
|---|---|---|---|
| 4,706,121 | 11/1987 | Young | 358/335 |
| 4,879,611 | 11/1989 | Fukui et al. | 358/908 |
| 5,446,488 | 8/1995 | Vogel | 358/908 |
| 5,488,409 | 1/1996 | Yuen et al. | 386/46 |

FOREIGN PATENT DOCUMENTS

| | | | |
|---|---|---|---|
| 424725A3 | 2/1991 | European Pat. Off. | H04N 7/087 |
| 90000847 | 1/1990 | WIPO | |
| 9003706 | 4/1990 | WIPO | H04N 7/173 |
| 9108626 | 6/1991 | WIPO | H04H 1/00 |

OTHER PUBLICATIONS

Neues Aus Der Technik, No. 3, Sep. 20, 1990, "Einfache Programmierung Eines Videorecorders".

European Broadcasting Union, Aug. 1990, "Specification of the Domestic Video Programme Delivery Control System (PDC)".

IEEE Transactions on Consumer Electronics CE-32, No. 3, "Decoder IC for an automatic video program identification system(VPS)".

Primary Examiner—Khoi D. Truong
Attorney, Agent, or Firm—Joseph S. Tripoli; Peter M. Emanuel; Thomas F. Lenihan

[57] ABSTRACT

Program related data contained in the broadcast signal of an advertisement for a future television show are evaluated and compared with the current TV set tuning when a LEARN button on a remote control is pressed. A VCR tunes to the present TV channel and stores the program related data for the future television show. The apparatus also ensures that a program to be recorded will start and end at the right time and that broadcast advertisements will be skipped during recording, are disclosed.

11 Claims, 1 Drawing Sheet

METHOD FOR PROGRAMMING A RECORDING DEVICE AND PROGRAMMING DEVICE

FIELD OF THE INVENTION

This invention relates to a method for programming a recording device and to a programming device.

BACKGROUND OF THE INVENTION

Programming a VCR to record a program which will be broadcast later, so called "Time Shift Recording", has always been one of the most difficult tasks to be performed by a user. Different user interface techniques have been employed in the past which are not perfect. Some interesting techniques simplifying the entry method, such as "VPS" marking or "VIDEO+", seem to help greatly the user, but none of these approaches takes into account the user's way of thinking.

SUMMARY OF THE INVENTION

A recent study of usage of home devices has enlightened the fact, that some users would like to be able to program their VCR by impulse choice when viewing advertisements for a show they would like to record. The present invention proposes a way to realize such impulse programming for time shift recording. Program related data contained in the broadcast signal are evaluated and compared with the current TV set tuning when a LEARN button on a remote control is pressed. The VCR tunes to the present TV channel and stores the interesting program data. The invention proposes also some features ensuring the user that his recorded program will start and end at the right time and skip out every advertisements which will be broadcast during the recorded program.

It is one object of the invention to disclose a method of programming a recording device which offers a very easy and natural way to perform the normally complicated programming task.

In principle the inventive method consists in programming a recording device, whereby data which are related to the status and to the time and to the date and to the identity and to the channel or frequency of the broadcast of a desired program are transmitted together with a present program, and wherein:—normally all of said data describe said present program;—if in a short time—especially few minutes—a new program will be broadcast on the current channel or frequency, said status data are set to a wait status and the other of said data describe said new program;—if there is broadcast in the present program an advertisement for a future program to be broadcast on this channel/ frequency or on another one, said status data are set to an information status and the other of said data describe said advertised future program, and wherein, when a user indicates that he, wants to record said desired new or future program, said data are extracted from said present program and are stored and used to automatically program said recording device, wherein before—especially few minutes—the start time of the broadcast of said desired program at said date said recording device is tuned to the respective channel or frequency, if necessary, and said recording device waits until said status changes from said wait status to a broadcast status and then starts recording, if said identity data match to the respective stored identity data.

Advantageous additional embodiments of the inventive method are resulting from the respective dependent claims.

It is a further object of the invention to disclose a programing unit which utilizes the inventive method.

In principle the inventive programming unit for programming a recording device comprises:—a data extractor which extracts from a present video and/or audio signal data, which are related to the status and to the time and to the date and to the identity and to the channel or frequency of the broadcast of a desired program, wherein: a) normally all of said data describe said present program; b) if in a short time—especially few minutes—a new program will be broadcast on the current channel or frequency, said status data are set to a wait status and the other of said data describe said new program; c) if there is broadcast in the present program an advertisement for a future program to be broadcast on this channel/frequency or on another one, said status data are set to an information status and the other of said data describe said advertised future program;—memory means which can store at least a part of said data;—a central processing unit which is connected to said memory means and to said data extractor and evaluates said data and controls respectively a recording device including a tuner, whereby the recording is allowed when said status changes from said wait status to a broadcast status and if said identity data match to respective identity data previously stored in said memory means;—an infra red receiver which is connected ~o said central processing unit and which receives and decodes a user's program command from an infra red remote control which subsequently initiates the operation of said central processing unit.

BRIEF DESCRIPTION OF THE DRAWING

Preferred embodiments of the invention are described with reference to the accompanying drawings, wherein.

DETAILED DESCRIPTION

Figure 1:
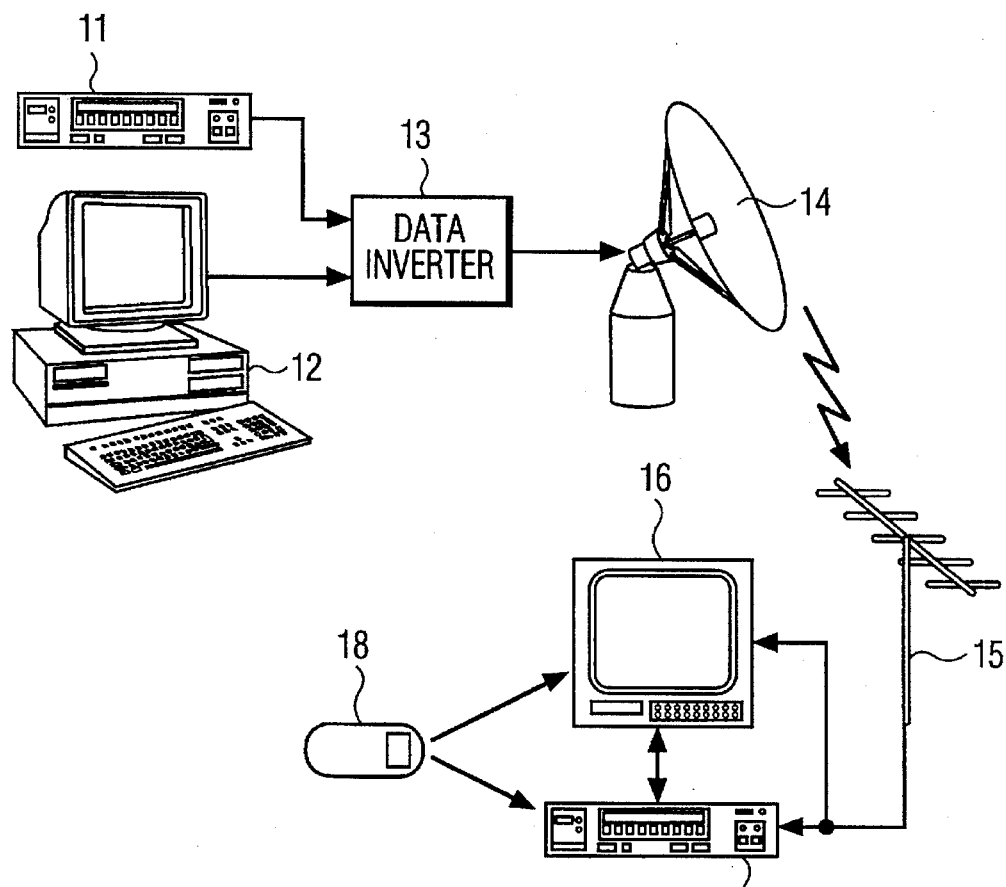
FIG. 1 is a block diagram of apparatus for executing the inventive method.

FIG. 1 illustrates a suitable hardware implementation of the invention. This figure represents two sides of the system. One side is the broadcast studio. This side is composed of some video sources 11, here materialized by a VCR, and a computer 12 which drives the video sources 11. The video signal provided by video source 11 is input to a device 13 called Data Inserter. The Data Inserter 13 receives some digital information from computer 12 and inserts respective program related data into the video signal. Different techniques can be used. For instance, the data can be inserted into the Vertical Blanking Interval (VBI) lines as in teletext systems. Including the data inserted, the video signal is transmitted over the air by a transmitter 14. The output signal may take any transmission path as satellite link, cable network or terrestrial diffusion. The second side represents the required equipment in the user's home. The TV signal passes through an antenna 15 to both, a TV set 16 and a VCR 17. The latter devices are able to exchange information, for instance by using a domestic bus. One unique remote controller 18 drives both the VCR and the TV set.

Figure 2:
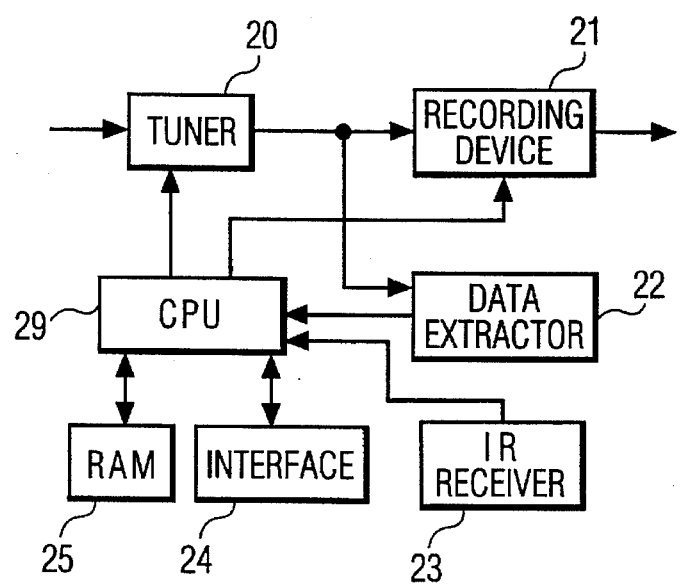
FIG. 2 is a detailed block diagram of circuits in a VCR for carrying out the invention.

In FIG. 2, the video signal received via antenna 15 is fed to a tuner 20. This tuner provides a demodulated video signal to known video processing elements 21 (e.g. a mechadeck) of the VCR and to a Data Extractor 22. The purpose of this Data Extractor 22 is to retrieve the digital information having been inserted previously in the video signal by Data Inserter 13. This information is delivered to a Central Processing Unit (CPU) 29 which typically is a micro controller. CPU 29 indicates to tuner 20 which channel to tune. It also drives the video processing elements 21. The CPU is able to communicate with TV set 16 through an interface bus 24. The remote controller 18 sends Infra Red information to the TV set and to the VCR which receives this information by an IR Receiver 23 and sends the respective evaluated information to CPU 29.

Data Stream

The TABLE below presents the data contained in the video signal (which e.g. have been inserted by Data Inserter 13):

TABLE I

| TYPE | INFORMATION/BROADCAST/PAUSE/WAIT |
|---|---|
| DATE | 07/01/93 |
| START HOUR | 10:17:40 |
| DURATION | 01:20:09 |
| CHANNEL | 34 |
| PROGRAM ID | 31234 |
| PERIODICITY | Wek Wek Sat Fri Thu Wed Tue Sun Mon |
| NAME (optional) | "OUT OF AFRICA" |

In Table I above, the first data field TYPE can have four different values: INFORMATION, BROADCAST, PAUSE, WAIT. The role of this field will be explained later.

The other data fields DATE, START TIME, DURATION, CHANNEL, PROGRAM ID, PERIODICITY and the optional field NAME describe a broadcasted program entirely.

The data field PERIODICITY comprises flags. If such a flag is set it defines the daily frequency of the program. For instance if both, WED and MON flags are set the program will be broadcast every Monday and Wednesday. If no flag is set the program will be broadcast only once at the date which is defined by data field DATE. The two week flags WEK define a weekly periodicity: 00—every week; 01—every fortnight; 10—every three weeks; 11—every month.

CPU 29 manages completely these data. It faces four situations as follows:

a) The channel is currently broadcasting the program itself. In that case, the data field TYPE is set to BROADCAST and the other data fields describe the currently broadcast program.

b) The channel will broadcast in a few minutes a program. In that case, the data field TYPE is set to WAIT and the other data fields describe the coming broadcast program.

c) The channel is broadcasting some advertisement for a future program, to be broadcast on this channel or on another one. In that case, the data field TYPE is set to INFORMATION and the other data fields describe the advertised program.

d) The channel is broadcasting some advertisements during the present program which are not related to a future program. In that case, the data field TYPE is set to PAUSE and the other data fields describe the temporarily interrupted program.

The invention works then in the following way:

Programming the VCR

Remote Controller 18 is equipped with a dedicated button called LEARN button. When the user watches on his TV set an advertisement for a program he would like to record, he simply pushes the LEARN button while seeing the advertisement. The Remote Controller 18 sends the corresponding command to the VCR. CPU 29 interrogates TV set 16 to check on which program it is tuned. Then CPU 29 requests tuner 20 to tune on the same channel than TV set 16. The Data Extractor 22 retrieves the respective program information and transfers it to the CPU. Then the VCR programs itself using the received data.

Advantageously a check is performed previously in order to verify that data field TYPE is equal to INFORMATION, else the learning operation is discarded. Advantageously, a Data Extractor can be implemented in the TV set, also. In that case, the VCR would receive the program information directly from the TV set. This solution has the advantage that the user can 'learn' a program even while the VCR is recording.

VCR Record Policy

After having been programmed accordingly the VCR will tune on the channel defined by data field CHANNEL a short time (e.g..few minutes) before the time defined by fields DATE, START TIME and PERIODICITY. It waits then until data field TYPE is set to BROADCAST. It verifies that the PROGRAM ID data match to the respective PROGRAM ID data previously stored in a memory 25 and then starts recording.

The recording is momentarily paused when data field TYPE changes its state. The recording resumes under the condition that TYPE is reset to BROADCAST and the PROGRAM ID data are matching. If TYPE is set to BROADCAST and the PROGRAM ID data do not match any more, the record is stopped definitely.

The interruption of the record policy can also be employed if the Time Shift Recording was programmed in a traditional way rather than in the way described above. But in that case, the check of the PROGRAM ID data is not performed and the start and stop times are defined by the user himself. But the VCR will not record the part of a program marked PAUSE, WAIT and INFORMATION.

The data extractor 22 may be located in the TV set. In this case the program information is transmitted via the digital bus to the VCR.

The data field NAME can be used to display the title of the recording on the VCR and/or on the TV set and/or on the remote control and/or to store this title on the recording medium.

Currently, home bus systems linking together a TV set and a VCR are not widely available. The following extension proposes a modification of the previous architecture in order to use a standard TV set which has no digital bus connection. Remote control 18 still drives both, TV set and VCR. In the VCR are stored the frequencies/channels which are assigned to the internal program storage numbers of the TV set. The remote control will memorize the last program storage number called on the TV set. After the LEARN button has been pressed the remote control transfers to VCR 17 this command and an additional information indicating on which program the TV set is tuned. The VCR then tunes to the assigned frequency/channel and does not need to interrogate the TV set. The link TV/VCR performed through the digital bus is not any more mandatory.

In the previous description the data describing the broadcast program are physically attached to the broadcast channel. Another solution is to provide one specific data channel, a so called "Barker" channel, which is dedicated to the description of the on-going programs. Each program provider would deliver the data to one central authority which would concatenate them into a common data stream broadcast on a specific frequency.

The Barker channel uses its complete bandwidth to carry the data. The data description proposed above is still valid. Some changing in the order of the parameters presentation could be made such as starting with the CHANNEL parameter. The VCR, rather than tuning to the current TV set channel, will tune to the Barker channel. Then it waits for the data of the watched channel to occur. This solution has a main advantage that there is one unique data insertion system for all the channels which reduces the investment.

Advantageously, the VCR can be programmed also in the standard way, but the invention proposes an easier way to perform this task.

The invention can also be used in case a radio and an Audio recording device (compact cassette recorder, DCC, Minidisc, DAB recorder, MOD) are used together, e.g. when receiving FM-RDS or DAB or digital satellite audio broadcasts.

What is claimed is:

1. A Method for programming a recording device (17), comprising the steps of:
receiving data related to information regarding status (TYPE), time (START TIME, DURATION), date (DATE), identity (PROGRAM ID), and channel or frequency (CHANNEL) of a broadcast of a desired program, said data being transmitted (14) together with a present program, said data (TYPE, START TIME, DURATION, DATE, PROGRAM ID, CHANNEL) describing said present program;

receiving data accompanying an advertisement of a new program to be broadcast on a current channel or frequency, said broadcast to occur before an expiration of a predetermined time period, said data having said status (TYPE) set to a wait status (WAIT) and the other of said data (START TIME, DURATION, DATE, PROGRAM ID, CHANNEL) set to describe said new program;

receiving data accompanying an advertisement for a future program to be broadcast on one of a plurality of broadcast channels or frequencies, said broadcast to occur after said expiration of said predetermined time period said data having said status (TYPE) set to an information status (INFORMATION) and the other of said data (START TIME, DURATION, DATE, PROGRAM ID, CHANNEL) set to describe said advertised future program;

extracting said data (TYPE, START TIME, DURATION, DATE, PROGRAM ID, CHANNEL) from said present program in response to an indication entered by a user that said user wants to record said desired new or future program;

storing said extracted data; and programming said recording device in accordance with said stored extracted data to tune to said channel or frequency of said desired program at a second predetermined time before a start time of the broadcast of said desired program, to wait until said status changes from said wait status (WAIT) to a broadcast status (BROADCAST), and thereafter to start recording, if said identity (PROGRAM ID) match respective stored identity data.

2. A method according to claim 1, comprising the further step of:
receiving data accompanying an advertisement not related to a desired program, said status (TYPE) being set to a pause status (PAUSE) and the other of said data (START TIME, DURATION, DATE, PROGRAM ID, CHANNEL) being set to describe a temporarily interrupted present program; and interrupting said recording device (17) until said status (TYPE) set to said broadcast status (BROADCAST) are received.

3. The method of claim 2 comprising the further step of:
pressing a related button on a remote control (18) which controls both, a television receiver (16) which receives the current program and the recording device (17) in order to enter said record command.

4. The method of claim 1 wherein said programming step comprises:
programming said recording device with periodicity data (PERIODICY) related to a sequence of desired programs.

5. The method of claim 1 wherein programming step comprises:
programming said recording device with title data (NAME); and further comprises at least one of the following steps,
displaying said title of the recording on said recording device (17);
displaying said title on a television receiver (16);
displaying said title on a remote control; and
storing said title data on a recording medium.

6. The method of claim 1 comprising the further step of:
pressing a related button on a remote control (18) which controls both, a television receiver (16) which receives the current program and the recording device (17) in order to enter a record command.

7. A programming unit for programming a recording device (17), comprising:

a data extractor (22) for extracting data from a present program comprising a video and/or audio signal, said data being related to information regarding status (TYPE), time (START TIME, DURATION), date (DATE), identity (PROGRAM ID), and channel or frequency (CHANNEL) of a broadcast of a desired program said data (TYPE, START TIME, DURATION, DATE, PROGRAM ID, CHANNEL) describe said present program;

said extractor also extracting data accompanying an advertisement of a new program to be broadcast on a current channel or frequency, said broadcast to occur before an expiration of a predetermined time period, said data having said status (TYPE) set to a wait status (WAIT) and the other of said data (START TIME, DURATION, DATE, PROGRAM ID, CHANNEL) set to describe said new program;

if there is broadcast in the present program an advertisement for a future program to be broadcast on this channel/frequency or a second channel/frequency, said status (TYPE) are set to an information status (INFORMATION) and the other of said data (START TIME, DURATION, DATE, PROGRAM ID, CHANNEL) describe said advertised future program;

memory means (25) which can store at least a part of said data;

a central processing unit (29) connected to said memory means (25) and to said data extractor (22) for evaluating said data, and for programming a recording processing device (21) including a tuner (20), to begin recording when said status changes from said wait status (WAIT) to a broadcast status (BROADCAST) if said identity (PROGRAM ID) match respective identity data previously stored in said memory means (25); and an infrared receiver (23) connected to said central processing unit (29) for receiving and decoding a user's program command from an infrared remote control (18), and conveying said command to said central processing unit.

8. The apparatus of claim 7, wherein said data extractor (22) for extracting all of said data (TYPE, START TIME, DURATION, DATE, PROGRAM ID, CHANNEL) is located in said recording device (17) and that a television receiver (16) and said recording device are connected by a digital bus on which a received signal which comprises all of said data is transferred to and evaluated (29) in said recording device.

9. The apparatus of claim 7, wherein said data extractor (22) for extracting all of said data (TYPE, START TIME, DURATION, DATE, PROGRAM ID, CHANNEL) is located in a television receiver (16) and that said receiving device and said recording device (17) are connected by a digital bus on which the extracted data are transferred to and evaluated (29) in said recording device.

10. The apparatus of claim 7, wherein said remote control (18) transmits currently selected internal program storage number to a television receiver (16), said data extractor (22) for extracting all of said data (TYPE, START TIME, DURATION, DATE, PROGRAM ID, CHANNEL) is located in said recording device (17), and channels or frequencies corresponding to preselected program storage numbers are stored in said television receiver and an infrared code comprising currently selected program storage number is evaluated (23) in said recording device and used for tuning currently selected program in the recording device when said user presses a button on said remote control (18).

11. The apparatus of claim 7 wherein all of said data (TYPE, START TIME, DURATION, DATE, PROGRAM ID, CHANNEL) are broadcast on a Barker channel and are extracted from said Barker channel.

* * * * *